United States Patent [19]

Harris, Jr. et al.

[11] 3,944,741

[45] Mar. 16, 1976

[54] PRINT RATE CONTROL SYSTEM

[75] Inventors: Samuel C. Harris, Jr.; Clifford M. Jones, both of Waynesboro, Va.

[73] Assignee: General Electric Company, Waynesboro, Va.

[22] Filed: Sept. 17, 1974

[21] Appl. No.: 506,908

[52] U.S. Cl. .............................. 178/23 R; 178/69 G
[51] Int. Cl.² ........................................... H04L 1/00
[58] Field of Search............ 178/23 R, 23 A, 24, 25, 178/17.5, 69 G; 101/93.01, 93.06

[56] References Cited
UNITED STATES PATENTS

| | | | |
|---|---|---|---|
| 3,337,686 | 8/1967 | Grant et al. ........................ | 178/23 R |
| 3,368,028 | 2/1968 | Windels et al. .................... | 178/23 R |
| 3,856,984 | 12/1974 | Merlino, Jr. et al. ............. | 178/23 A |

Primary Examiner—Thomas A. Robinson
Attorney, Agent, or Firm—Michael Masnik

[57] ABSTRACT

Maximizing the printing rate of an electronic printer by causing it to print data characters at a relatively constant rate despite variations in the pattern of the incoming data. The number of characters in an incoming data pattern to be printed substantially simultaneously is monitored and the printing rate controlled within certain limits to provide a maximum printing rate consistent with the power and mechanical limits of the printer design.

16 Claims, 5 Drawing Figures

PRINT RATE CONTROL SYSTEM

BACKGROUND OF THE INVENTION

The present invention relates to electronic data processing and more particularly to methods and means for maximizing the rate of printing by electronic printers by varying the printing rate as a function of the print density of data being received from a remote source.

Printing systems exist today that have the capability of responding to data from a source at the normal printing speed of the printer. Oftentimes because of electronic and mechanical limitations associated with the printing process, these printing systems are designed to operate well within the worst case situation. Such arrangements do not distinguish between variations of the print density of data being received from the source. It would be desirable if the printing function could be carried out substantially always at the maximum printing rate consistent with the power and mechanical limits associated with the printer design.

A particular application for such a system exists in the case of the line printer wherein a full line of input data characters are stored in memory then processed sequentially before a plurality of such stored input data characters are printed along a line on a record medium. In such an arrangement it would be desirable to control the number of characters printed simultaneously during any one alignment of print characters, which do the printing, along a line on a record medium. It is also desirable to limit the maximum rate at which the print characters are caused to effect printing over a period of time corresponding to a plurality of such alignments.

One prior art approach detects a droop in the power supply voltage and inhibits line feed for a predetermined duration. Using the droop in a power supply is not a sufficiently precise method for effecting close control. Also it is desirable to delay printing to varying degrees depending on the degree of variations in print rate.

Protection also is provided against an excessive average print rate by inhibiting line feed for a predetermined time after the line is printed. However, for certain data this approach would result in excessive delay and therefore provide less than the maximum tolerable print rate.

Accordingly, one object of the invention is to provide an improved apparatus for controlling the printing of a printing system so that it operates at a maximum rate within the power and mechanical limitations of the system design.

Another object of this invention is to provide a method and apparatus for maximizing the printing speed of an electronic printer despite variations in the patterns of incoming data.

Another object of this invention is to suspend printing of input data character signals whenever the number of such signals available for printing exceed a predetermined number during any single alignment of print characters along a line on a record medium.

Another object of this invention is to provide a method and apparatus for suspending printing of input data character signals whenever the number of such signals available for printing exceeds a predetermined average rate.

Another object of this invention is to protect a printer from overstress due to an excessive number of columns of symbols or characters being printed substantially simultaneously, while preventing loss of data due to the protecting scheme.

Another object of this invention is to protect a printer from overstress due to an excessive print rate, while insuring that printing take place substantially at no less than an acceptable maximum average rate, even though the data pattern has considerable variation.

Another object of this invention is to provide an improved data printing method and arrangement for a printer having design limitations.

In accordance with one embodiment of the invention, an arrangement is provided wherein a plurality of recording characters are adapted for effective serial movement across each line in succession on a record medium containing column locations and a plurality of such characters are available for substantially simultaneous recording along each line. To control recording, means are provided for sensing the number of such characters to be substantially simultaneously recorded during each columnar alignment of said characters to provide a control signal when said number reaches a limit N, where N represents less than the maximum number of aligned characters which could be printed during such alignment, and means responsive to said control signal to limit recording of characters within each such alignment to a number which is a function of the value of N.

Further recording control is provided by means which sense the number of such characters to be recorded during a given plurality of columnar alignments of said characters to provide a control signal when said number reaches a limit M, where M represents less than the maximum number of aligned characters which could be recorded during such given plurality of columnar alignments, and means responsive to said control signal to limit recording of characters within such given plurality of alignments to a number which is a function of the value of M. In a particular embodiment, said given plurality of alignments corresponds to a given plurality of lines, and the means responsive to said control signal limits recording of characters beyond the completion of the character recording on the line associated with the providing of said control signal.

BRIEF DESCRIPTION OF THE DRAWINGS

The features of the present invention believed to be novel are set forth with particularity in the appended claims. The function itself however both as to organization and method of operation together with further objects and advantages thereof may best be understood by reference to the following description taken in conjunction with the accompanying drawings in which:

DESCRIPTION OF TYPICAL EMBODIMENTS

Figure 1:
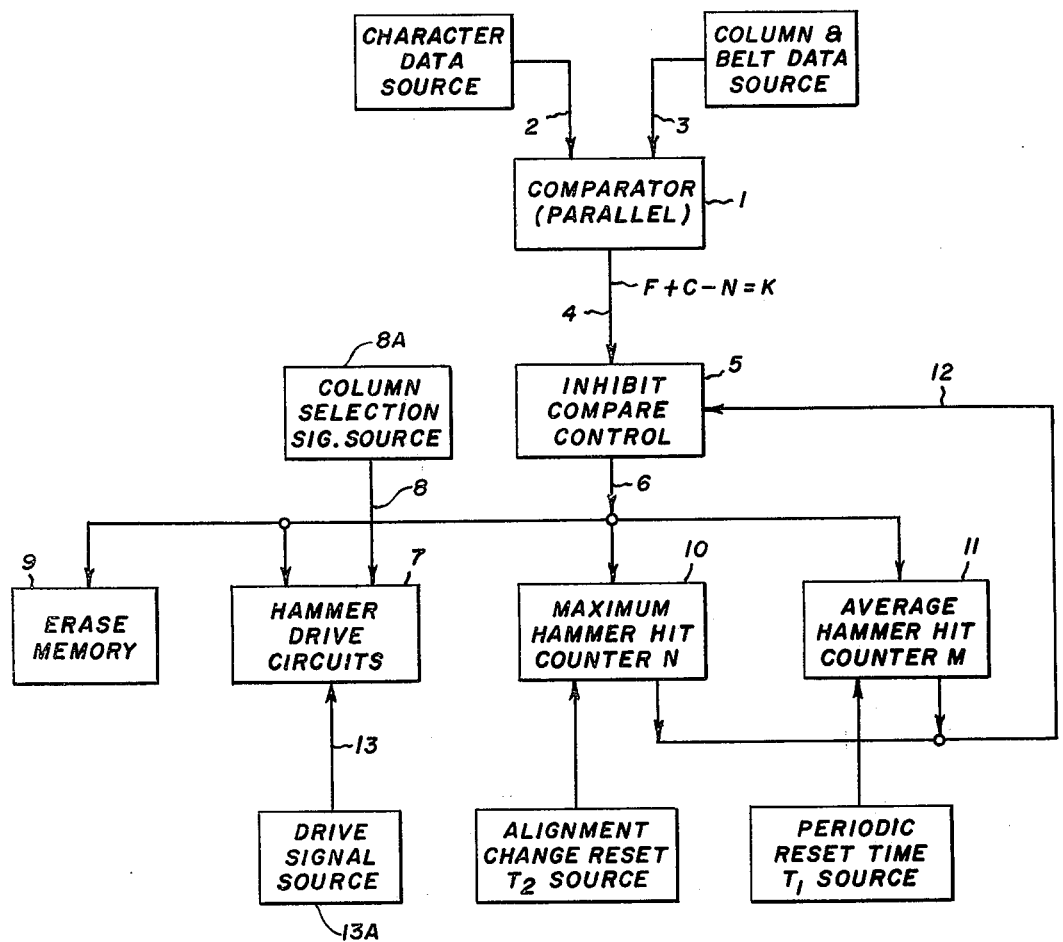
FIG. 1 shows in block diagram form certain general considerations involved in line printers wherein the invention would be applicable.

Referring to FIG. 1 there is shown a generalized block diagram of one embodiment of the invention as applied to a line printer. In such a printer the input data characters received from a source not shown are stored in a memory or other storage device. Generally this involves storing a line of input data characters at a time. The data received from the source is stored in memory in the sequence in which it is to be printed along a line on a record medium by means such as impact printing through an inked ribbon onto paper. The printing mechanism itself generally involves providing relative movement between print characters or type and the record medium. This could involve type carried by a drum or disk, belt, etc. For purposes of this description, it shall be assumed that the printing is accomplished by flexible fingers carried by an endless belt wherein the printing type is located at one extremity of the finger. As the belt with fingers moves across a line on a record medium, hammers located along the line of printing are energized to selectively strike and drive the type bearing fingers to impact the paper through an inked ribbon. For further details of this type of type belt arrangement reference can be made to the U.S. Pat. No. 3,803,558 issued to Clifford M. Jones and Earle B. McDowell on Apr. 9, 1974 and assigned to a common assignee. In order to accomplish printing of type characters at the desired column locations where a moving belt of type is involved, certain data needs to be processed. In the particular embodiment selected for explaining the invention, this involves comparing the input data characters stored in memory, the column at which the characters are to be printed and the instantaneous location of the moving belt and type fingers.

In FIG. 1 a comparator 1 responds to input data characters available over lead 2 from a memory source not shown and the column information associated with each input data character available on 2 as well as the column location of the individual type fingers on the rotating belt all available on lead 3. In the particular embodiment mentioned in the aforesaid patent the comparator performs the comparison $F + C - N = K$ where $F$ is the number representing or associated with the instantaneous location of a particular type finger, $N$ is a number representing the input data character being considered and $C$ is the number representing the column location at which such input data character is to be printed and where $K$ is a number determined by the number of sets of print characters or type fonts involved in the comparison process. Thus, for example, if the comparison involved only a single set, $K$ would be zero. If two sets, then $K$ would be the value of the number of characters in the set. If three sets, then $K$ would be twice the value of the number of characters in the set. The comparison is satisfied when a logic signal is produced indicating that the type finger at the given column location along a line on the record medium corresponds to the input data character desired to be printed at that location. For each alignment of type characters with columns along a line on the record medium the comparator performs the aforesaid comparison for all of the input data characters stored in memory and produces an equal comparison signal on lead 4 for each character in memory for which a corresponding print character is located at the column location where such data character is to be printed. For purposes of discussion the equal compare signals available on 4 occur serially in the order in which the comparisons are carried out by comparator 1. The inhibit compare control block 5 is normally open and passes the equal compare signals available on lead 4 over lead 6 to a plurality of circuits. One such output is applied to the hammer drive circuit 7. Hammer drive circuit 7 comprises well known circuits which respond to equal compare signals to gate a drive signal available on 13 from source 13A to the hammer associated with the column selection signal available on 8 from source 8A. The hammer drive circuit thus drives selected print characters carried by the belt into the record medium at an appropriate time. In the particular embodiment described the hammer drive circuits receive column selection signals over lead 8 and equal compare signals on lead 6. As the columns are successively scanned each equal compare signal developed at that time preconditions a respective hammer located at the corresponding column position. At the end of the compare cycle a drive signal over lead 13 from 13A causes only all of those hammers preconditioned to be operated to simultaneously print characters at the selected column locations. The equal comparison signal is also applied to the erase memory block 9 to erase from storage the signal representing the character printed in order to enable subsequent characters representing signals to be stored for processing. Thus far we have provided a brief description of an existing line printer arrangement. Under the circumstances thus described, printing by the hammer drive circuit 7 would continue at a predetermined rate. Where there are power and mechanical limitations associated with a particular printing system design, the printing rate is oftentimes selected to be a rate to accommodate the worst case condition. This worst case condition could occur infrequently, depending on the format or pattern of input data characters to be printed. Under these circumstances, printing would be taking place at a lower rate than a desired maximum rate. Rather than accommodate this worst case condition, it would be desirable to protect the machine by limiting the maximum number of input data characters to be printed during one alignment of print characters with respect to column location to a number consistent with the mechanical and electrical design limitations of the machine. It would also be desirable to limit the maximum rate at which the print characters are caused to effect printing over a period of time corresponding to a plurality of alignments. In one embodiment, the plurality of alignments corresponded to several lines of print data. Referring to FIG. 1 there is provided a counter 10 which is identified as a hammer hit counter N. Counter 10 is an up counter which responds to successive equal compare signals availabe on lead 6 for counting up to a predetermined number N. If the counter counts up to N during a single alignment of print characters it provides an inhibit signal on lead 12 for application to the inhibit compare control block 5. This signal blocks further equal compare signals from being applied from comparator 1 to the hammer hit counter 10. It also prevents equal compare signals from being applied to the hammer drive circuits to effect printing and the erase memory 9 and the other block 11 whose functioning will be described shortly. At the beginning of each alignment of print characters, counter 10 is restored by an alignment change reset signal T2. Average hit counter 11 responds to equal compare signals available over lead 6 for counting up.

If counter 11 produces a count of M counted pulses for a period established by the periodic reset time T1, it produces an inhibit signal on lead 12 for application to control block 5. The inhibit signal on lead 12 blocks the application of equal compare signals from being applied to the counter 11. It also prevents the application of such signals to counter 10, the erase memory 9 and the hammer driver circuit 7, Thus no further printing takes place by the hammer driver circuit until the reset signal T1 is applied. In one particular embodiment, counter 10 counts to 30 hammers per column change whereas counter 11 counts to 125 hammers in each 250 milliseconds. Thus the T2 pulses occur every 1 millisecond whereas the T1 pulses occur over a range of 100 to 1000 milliseconds.

Generally speaking therefore we have described a means responsive to a plural integral number of equal comparisons for each different alignment of print characters along a line on a print medium for providing a first control signal with means responsive to this first control signal for suspending printing in response to further comparison of data column information and print character position. Also means are provided that respond to a plural integral number of equal comparisons for a given plurality of such different alignments occurring in succession for providing a second control signal with means responsive to the second control signal for suspending printing of input data character signals.

Thus far we have described a protective system for a printer wherein detection of an approaching overload condition during an alignment of the print characters with respect to the columns along a line of print on a record medium is utilized to limit or suspend printing during such alignment. The overload condition is defined by an excessive number of columns of symbols being printed substantially simultaneously. Also detection of a second form of an approaching overload condition due to an excessive printing rate is utilized to limit or suspend printing when the detection is made.

It is desirable under certain circumstances to suspend or limit printing in response to sensing of said second form of overload condition only after the line in which the detection occurs has been printed. This latter approach may be more compatible with line printers wherein data is entered and stored in memory, a line at a time. This could result because of limited buffer storage within the data source. The latter approach also results in greater smoothness of operation, since suspension of printing occurs at the end of the line and the time to print any one line remains relatively constant. The following discussion is concerned with an embodiment directed to sensing this second form of overload condition and limiting or suspending printing at the end of a line of print.

Figure 2:
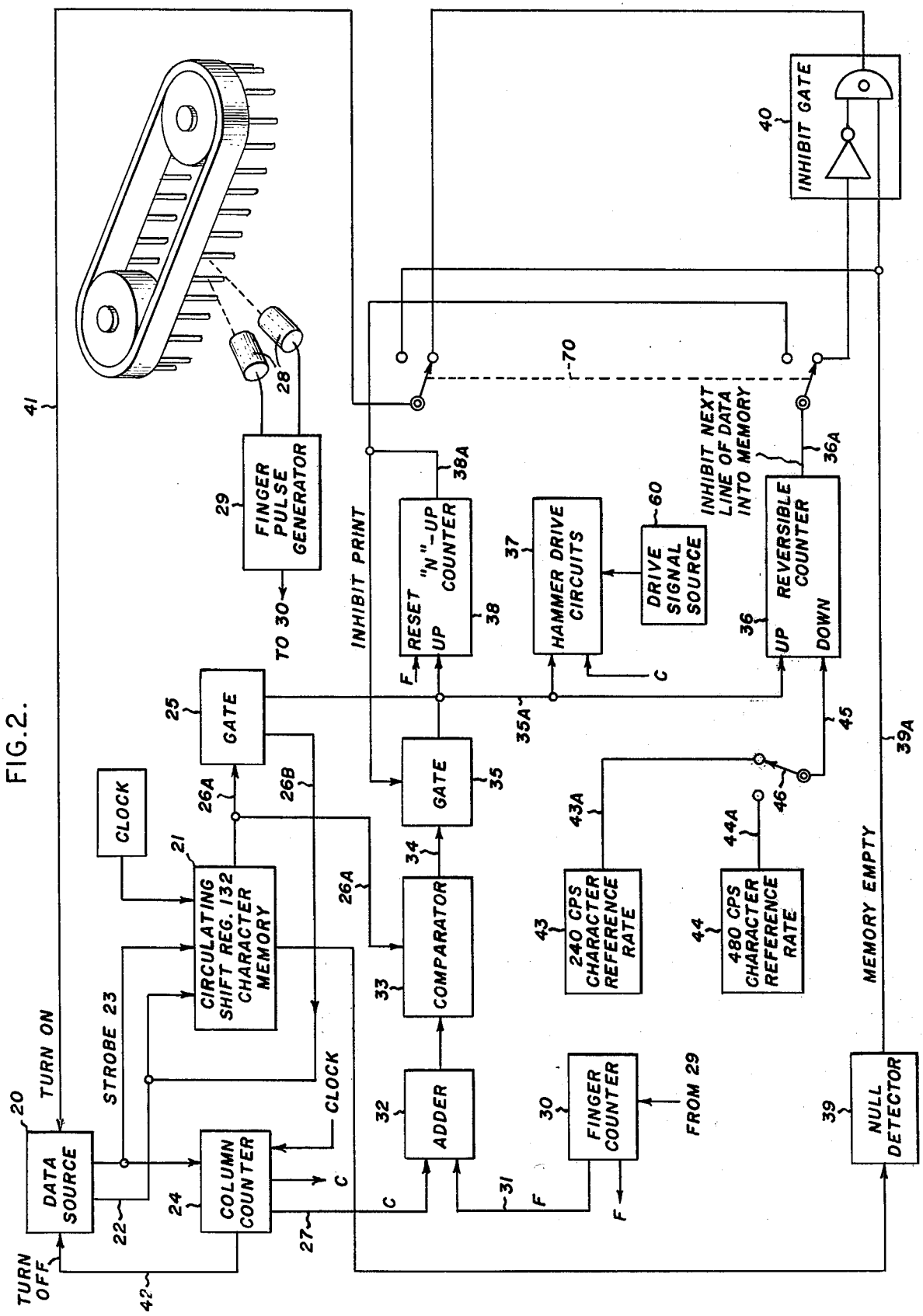
FIG. 2 illustrates in detail block diagram form features of the present invention particularly in their application to a line printer.

Referring to FIG. 2 there is shown a detailed block diagram of the further application of the present invention to a line printer of the type employing a belt arrangement as set forth in the aforementioned patent to Clifford M. Jones et al. Data available from source 20 is applied to the circulating shift memory or signal storage register 21. The source may comprise a recorded tape, a computer, a telephone line or any other source of digital data. Generally speaking the printers operate in a particular code format. A popular code is the ASCII code which is an eight level code of which 7 bits are data and the 8 bit is parity. The data is applied in bit parallel, character serial form over lead 22 to the memory 21. In this arrangement it is conventional for the data source 20 to provide a strobe signal on lead 23 also for application to the memory 21. The strobe signal available on 23 applied to memory 21 shifts the memory register, and applied to column counter 24 increments the column counter 24 by one. After a line of data from source 20 has been entered into memory 21 under control of the strobe signal 23, the recirculation of this data in the memory is under the control of signals available from a clock. As the data circulates in memory during the printing sequence to be described, and following the load sequence just explained, column counter 24 under control of clock signals provides column information for the particular data character appearing at the memory output gate 25 in the recirculation loop comprising leads 26A and B. Whatever data character appears on lead 26A, its column location is defined by a signal available on lead 27 at the output of column counter 24. It should be noted that with the absence of an equal compare signal on 35A, whatever character appears on lead 26A passes through gate 25 and appears on line 26B. The functioning of gate 25 will be described shortly.

For purposes of describing the comparator, use will be made of the symbols F, C and N which have previously been identified. The source of F signals in one particular embodiment was a belt with a photoelectric finger detector which detected the passage of individual type or print character fingers past a photoelectric cell detector. The output of detector 28 when processed in finger pulse generator 29 produces individual impulses constituting the passage of individual fingers past a reference point located with respect to the moving belt. The application of the finger pulses to finger counter 30 results in an up count. The up count on lead 31 identifies the particular alignment of the type fingers carried by the belt. The F and C signals available on leads 31 and 27 are applied to adder 32 where they are combined before application as a sum signal to the comparator 33. Comparator 33 also receives the input data character signal available on lead 26A. Comparator 33 operates to process the F, C and N signals in accordance with the algorithm $F + C - N = K$ as previously mentioned. Whenever an equal comparison result obtains, an equal comparison signal appears on lead 34. This equal comparison signal is applied through inhibit gate 35 to the reversible counter 36, the hammer drive circuit 37, the up counter 38 and the erase gate 25. As previously mentioned, the hammer drive circuit 37 responds to the equal comparison signal available from gate 35 and the column count signal available from counter 24. For each column count signal the hammer located at that particular column position is preconditioned to operate in response to drive signals available from source 60 if there also appears an equal compare signal at the output of gate 35. Thus during one alignment of the print characters one or more of the hammers are preconditioned during the compare cycle for firing during the drive cycle. During the drive cycle all of the hammers that were preconditioned are operated to cause simultaneous printing of the type characters located at the column locations associated with the characters to be printed. Since the output of gate 35 is applied to gate 25 anything that is to be printed by the hammer drive circuit 37 during the drive cycle is erased from memory 21. When all characters in memory have been erased, the null detector 39 responsive to the void in memory 21 produces a memory empty signal for application through inhibit gate 40 to turn on the data source 20 and cause the next line of data characters to be introduced into memory under the control of the associated strobe signals. It should be noted that the data source 20 had previously been turned off in response to the column counter 24 producing an output on lead 42 indicating that the memory has been filled. In a particular embodiment, the memory was designed to hold 132 characters.

Equal compare signals available on lead 35A are counted by up counter 38. This counter provides a control signal on line 38A when its count reaches the maximum number of printed characters allowed during a single alignment. Control signals on line 38A are applied to the inhibit gate 35 to suppress the further application of equal comparison signals during the given alignment. In the particular embodiment the up counter was set to provide an inhibit signal on the count of 30 equal compare signals during one alignment to limit to 30 hammer operations during one alignment. Regardless of the count stored in the up counter 38, periodically at the end of each alignment period an F signal is received indicating that the up counter is to be reset for the next alignment.

Equal compare signals available on lead 35A are also counted by the reversible counter 36. This counter sees a first set of signals on its up lead to cause the reversible counter to count in an up direction. It also receives signals at its down input lead to cause the reversible count to count in a down direction. With the switch 46 in the position indicated, signals are available at the down input leads of counter 36 over lead 43A from character reference signal source 43. Signal source 43 produces periodic pulses at a rate corresponding to a desired printing rate such as, for example, 240 characters per second. This represents approximately 120 lines per minute which in a particular embodiment also corresponds to the maximum printing rate consistent with the power and mechanical limitations of the design. When the signal available from leads 43A and 35A occur at the same rate, there is no change in the count stored in the reversible counter 36. Whenever the rate of equal comparison signals exceeds the character reference rate, the reversible counter counts up. When the reversible counter 36 counts up to a predetermined number, it produces an output signal on lead 36A which indicates that more than the tolerable number of hammer operations have occurred for a given plurality of different alignments of the print characters on the belt. Under these circumstances, signals on 36A are applied to inhibit gate 40 to inhibit or block the turn on signals which would normally be delivered to lead 41 from the null detector 39. Under these circumstances, therefore, no further data is supplied from source 20 to the data processing system for printing consideration. With the suppression of data from source 20, the production of equal comparison signals on lead 35A ends when the remaining data characters in memory 21 have been processed in comparator 33 and printed by application over lead 35A to the hammer drive circuit 37. It should be noted that the reversible counter 36 continues to respond to the equal comparison signals available on lead 35A because it has been provided with sufficient capacity to count beyond the value at which an inhibit signal is generated at its output lead 36A. In a particular embodiment the reversible counter was designed to have a full count of 1023 pulses but its inhibit signal was set to occur at 896 counts which provides a margin of the order of 14% overshoot for the balance of a print line associated with the generation of the inhibit signal on lead 36A. When counter 36 overflows it yields a logic level 1 signal in 36A. The inverter in 40 converts this to a logic 0 blocking the AND gate so that a turn on signal is not available on lead 41 even though a memory empty signal exists on 39A. When counter 36 is counted below an overflow, then AND gate in 40 responds to this and a memory empty signal from 39 to produce a turn on signal on 41. Thus after all of the characters from memory 21 have been processed and printed, the reversible counter begins to count down in response to the character reference rate signals available on 43A. This countdown occurs until the reversible counter has been counted below the preset level which previously was described as constituting 896 counts. Thereupon the turn on signal on 41 produced by the memory empty signal on 39A is removed from 36A, enabling inhibit gate 40 to signal the data source 20 to transfer the next line of characters to memory 21 by the turn on signal developed on lead 41.

Figure 3:
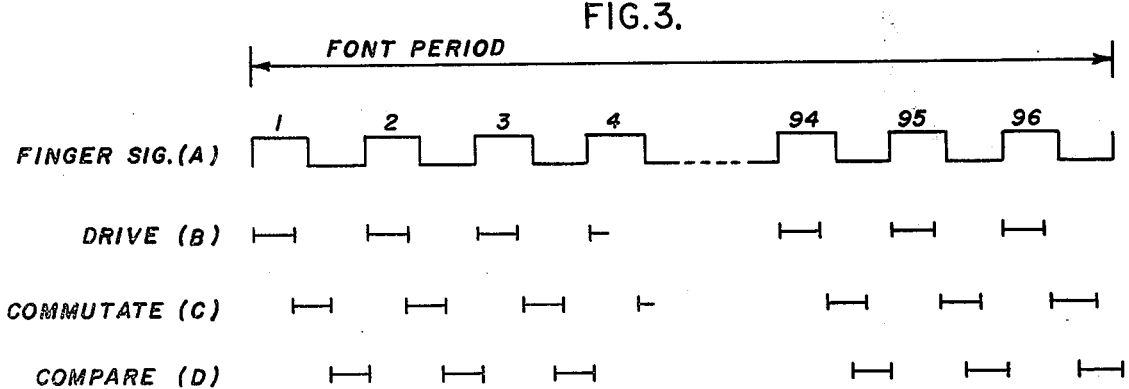
FIG. 3 illustrates certain block diagrams useful in explaining the operation of the present invention.

Reference can now be made to FIG. 3 which illustrates graphically some of the timing periods involved in the operation of the present invention. For example, for a set of type or print characters or font of 96 characters, a finger pulse signal is generated for each print character past detector 28 as set forth in graph A. During the start of successive finger signals a drive period, a commutation period and a compare period are established wherein the drive period B represents the period when the preconditioned hammers are energized to simultaneously print the appropriate characters during a particular alignment of the print fingers. The period represented by graph C indicates time between finger intervals when the hammer circuits are restored to their rest condition. During compare period D, the finger, data and column information are processed to generate equal compare signals.

Figure 4:
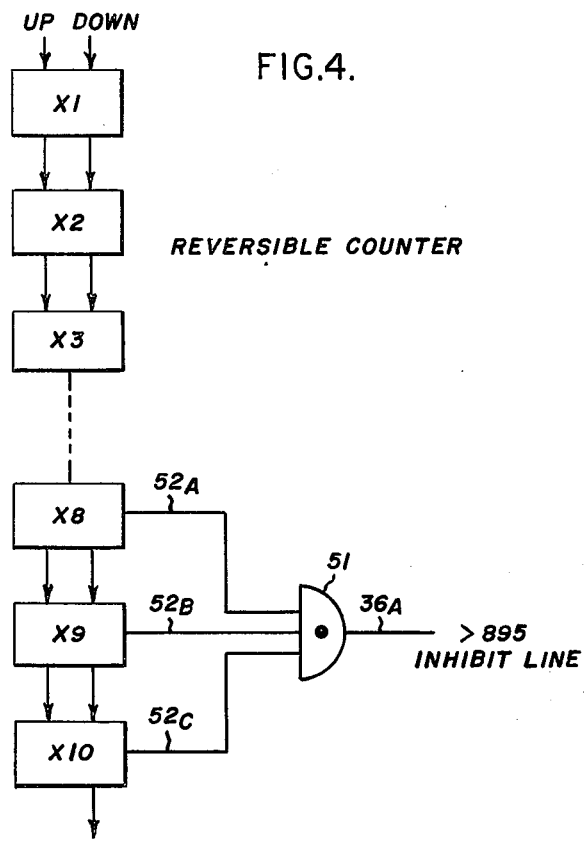
FIG. 4 illustrates in block diagram form one embodiment of a reversible counter which is well known in the art.

FIG. 4 illustrates in block diagram form one embodiment of a reversible counter which is well known in the art. In this counter the successive binary stages are identified by blocks X1 through X10. In this arrangement after a net up count of 895, an output signal is delivered on lead 50. This will occur when the last three stages of the counter are set. This condition is noted by having the AND gate 51 respond to the terminals identifying the states of stages X8, X9 and X10 on leads 52A, B and C respectively. In addition, any count in excess of 895 will produce the same output on leads 52A, B and C. This same output detected by AND gate 51 produces an inhibit signal on the lead 36A. In a practical application the maximum count of 1023 is sufficiently in excess of the counts to be accommodated between the time inhibiting action starts and the memory is cleared of data.

Figure 5:
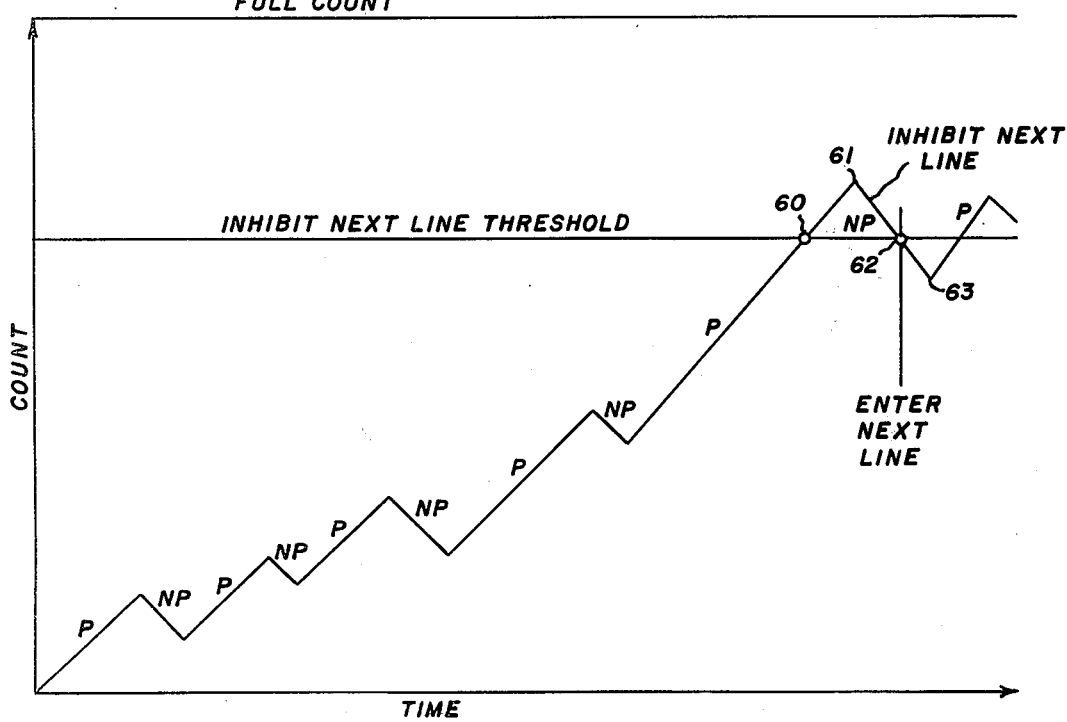
FIG. 5 illustrates graphically the manner in which the present invention operates to produce the desired results.

The manner in which the present invention operates to produce the desired results can be gleaned by reference to FIG. 5 wherein the reversible counter is plotted with respect to time over several successive alignments of the print characters with the column locations on the record medium. The graph is intended to indicate a typical operating situation. For purposes of discussion it is assumed that the printer has been idle and the counter is at zero count. During the portions of the graph labeled P the printer is printing in response to equal comparison signals being generated and the counter is counting upward since the rate of equal comparison signal occurrences is exceeding the character reference rate. During the portion of the graph labeled NP no printing occurs as for example in response to a line feed, or paper handling, or space codes or other control functions not involving printing are taking place. During this period of time since no equal comparison signals are being generated, the counter begins to count down in response to the continuing occurrence of character reference signals. This upward trend in the count rate of the counter is shown to continue until the count exceeds a threshold level entitled inhibit next line threshold. At this point the inhibit gate 40 produces a signal to block further data from being supplied from data source 20 to the character memory 21. Even though the data source has been turned off, data still is shown to remain in character memory and is processed for printing by producing equal comparison signals which drive the reversible counter further to point 61 until all equal compare signals corresponding to characters still remaining in memory have been processed. Thereafter since no data is being made available from data source, the reversible counter is counted down as shown until point 62 is reached on a curve at which time the inhibit signal at the output of reversible counter is removed enabling the memory empty signal available from 39 to turn on the data source 20. Since it takes some time for the data to be processed through the memory and comparator, etc., the graph shows that the reversible counter continues to count down until equal compare signals begin to appear on lead 35A at which time these equal compare signals cause the reversible counter to start counting up again. Having reached this stabilized condition, therefore, reversible counter is caused to count above and below the threshold line which represents maximum printing rate of the printer consistent with power and mechanical limitations imposed by the system design.

While the invention was described in terms of an arrangement involving a 240 character per second reference rate, the invention can readily accommodate a different reference rate. By moving switch 46 to connect with 44 over lead 44A, a 480 character per second reference rate may be established.

Also while the reversible counter overflow signal has been shown as being employed to turn on data source 20 by operating switch 70 to its other position, the overflow signal is applied to gate 35 to block further delivery of equal compare signals to leads 35A. In some applications it may be desirable to arrest printing immediately.

Also while reference is made to the generation of a control signal (to limit recording or printing) in response to an operating characteristic such as the number of characters to be substantially simultaneously recorded during a given period, this is intended to include response to a characteristic relating to the actual recording or printing process under way. For example, the hammers actually being operated may be counted during the hammer drive cycle and a useful control signal generated before the hammers have completed their cycle of printing.

While the invention has been particularly shown and described with reference to preferred embodiments thereof, it will be evident to those skilled in the art that various changes in form and detail may be made without departing from the spirit and scope of the invention.

What we claim as new and desire to secure by Letters Patent of the United States is:

1. In an arrangement wherein a plurality of recording characters are adapted for effective serial movement across each line in succession on a record medium containing column locations ad a plurality of such characters are available for substantially simultaneous recording along each line in accordance with a pattern of data, means responsive to the number of such characters to be substantially simultaneously recorded during each columnar alignment of said characters to provide a control signal when said number reaches a limit N, where N represents less than the maximum number of aligned characters which could be printed during such alignment, and means responsive to said control signal for limiting recording of characters within each such alignment to a number which is a function of the value of N.

2. An arrangement according to claim 1 further comprising means responsive to the number of such characters to be recorded during a given plurality of columnar alignments of said characters to provide a control signal when said number reaches a limit M, where M represents less than the maximum number of aligned characters which could be recorded during such given plurality of columnar alignments, and means responsive to said control signal for limiting recording of characters within such given plurality of alignments to a number which is a function of the value of M.

3. An arrangement according to claim 2 wherein said given plurality of alignments corresponds to a given plurality of lines, and said means responsive to said control signal limits recording of characters beyond the completion of the character recording on the line associated with the providing of said control signal.

4. An arrangement according to claim 1 wherein said means responsive to said control signal suspends recording of characters beyond the character associated with the providing of said control signal.

5. An arrangement according to claim 1 comprising a counter, a source of first signals representing changes in columnar alignment of characters, a source of second signals representing individual characters to be recorded, said counter responsive to said second signals to produce a count indication corresponding to the number of characters to be recorded, means responsive to a count indication of N from said counter to provide said control signal, and means responsive to each of said first signals to reset said counter to an initial count.

6. An arrangement according to claim 5 further comprising means for applying said second signals to said counter and said means responsive to said control signal blocking the application of said second signals to said counter for the balance of the period of the columnar alignment associated with the producing of said control signal.

7. In an arrangement wherein a plurality of recording characters are adapted for effective serial movement across each line in succession on a record medium containing column locations and a plurality of such characters are available for substantially simultaneous recording along each line in accordance with a pattern of data, means for sensing the number of such characters to be recorded during a given plurality of columnar alignments of said characters to provide a control signal when said number reaches a limit M, where M represents less than the maximum number of aligned characters which could be recorded during such given plurality of columnar alignments, and means responsive to said control signal for limiting recording of characters within such given plurality of alignments to a number which is a function of the limit M.

8. An arrangement according to claim 7 wherein said given plurality of alignments corresponds to a given plurality of lines, and said means responsive to said control signal limits recording of characters beyond the completion of the character recording on the line associated with the providing of said control signal.

9. An arrangement according to claim 8 further comprising means for recording characters in response to transmitted data signals wherein each of said plurality of recording characters represent a given data signal, and means responsive to said control signal to interrupt transmission of such data signals beyond the transmission of all data signals associated with the line associated with the providing of the control signal.

10. An arrangement according to claim 7 comprising a reversible counter, a source of first signals having a given reference rate, a source of second signals representing individual characters to be recorded, said counter responsive to said first signals to cause the counter to count in one direction at said reference rate and responsive to said second signals to cause the counter to count in the other direction an amount corresponding to the number of characters to be recorded, means responsive to the net count of the counting in the two directions reaching said limit of M for limiting recording of characters within such given plurality of alignments to a number which is a function of the value of M.

11. An arrangement according to claim 10 further comprising means for recording characters in response to transmitted data signals and means responsive to said control signal to interrupt transmission of such data signals for a period of time until the counter counts to a given value in said one direction in response to said first signals.

12. In an arrangement wherein a plurality of individual different printing characters are carried in sequence to succcessive indexed positions along a line to be printed on a record medium, such that a plurality of such characters are in alignment for substantially simultaneous printing at each of such positions in accordance with a pattern of data, means for sensing the number of such characters to be substantially simultaneously printed during each columnar alignment of said characters to provide a control signal when said number reaches a limit N, where N represents less than the maximum number of aligned characters which could be printed during such alignment, and means responsive to said control signal for limiting recording of characters within each such alignment to a number which is a function of the value of N.

13. In an arrangement wherein a plurality of recording characters are adapted for effective serial movement across each line in succession on a record medium containing column locations and a plurality of such characters are available for substantially simultaneous recording along each line in accordance with a pattern of data signals available from a source, first means coupled to said source and said recording characters for generating first signals representing the characters to be recorded for each of a plurality of columnar alignments of said characters, means for analyzing said first signals to indicate the number of such characters to be recorded during such given plurality of columnar alignments of said characters to provide a control signal when said number reaches a limit M, where M represents less than the maximum number of aligned characters which could be recorded during such given plurality of columnar alignments, and means responsive to said control signal for limiting recording of characters within such given plurality of alignments to a number which is a function of the limit M.

14. An arrangement according to claim 13 wherein said means for analyzing comprises a reversible counter, a source of second signals having a given reference rate, said counter responsive to said second signals to cause the counter to count in one direction at said reference rate and responsive to said first signals to cause the counter to count in the other direction an amount corresponding to the number of characters to be recorded, means responsive to the net count of the counting in the two directions reaching said limit of M for limiting recording of characters within such given plurality of alignments to a number which is a function of the value of M.

15. An arrangement according to claim 14 further comprising means responsive to said control signal to interrupt the availability of such data signals for a period of time until the counter counts to a given value in said one direction in response to said second signals.

16. An arrangement according to claim 15 further comprising means for analyzing said first signals to indicate the number of such characters to be recorded during each of said columnar alignments of said characters to provide a second control signal when said number reaches a limit N, where N represents less than the maximum number of aligned characters which could be printed during each such alignment, and means responsive to said second control signal for limiting recording of characters within each such alignment to a number which is a function of the value of N.

* * * * *